United States Patent Office 3,110,033
Patented Nov. 12, 1963

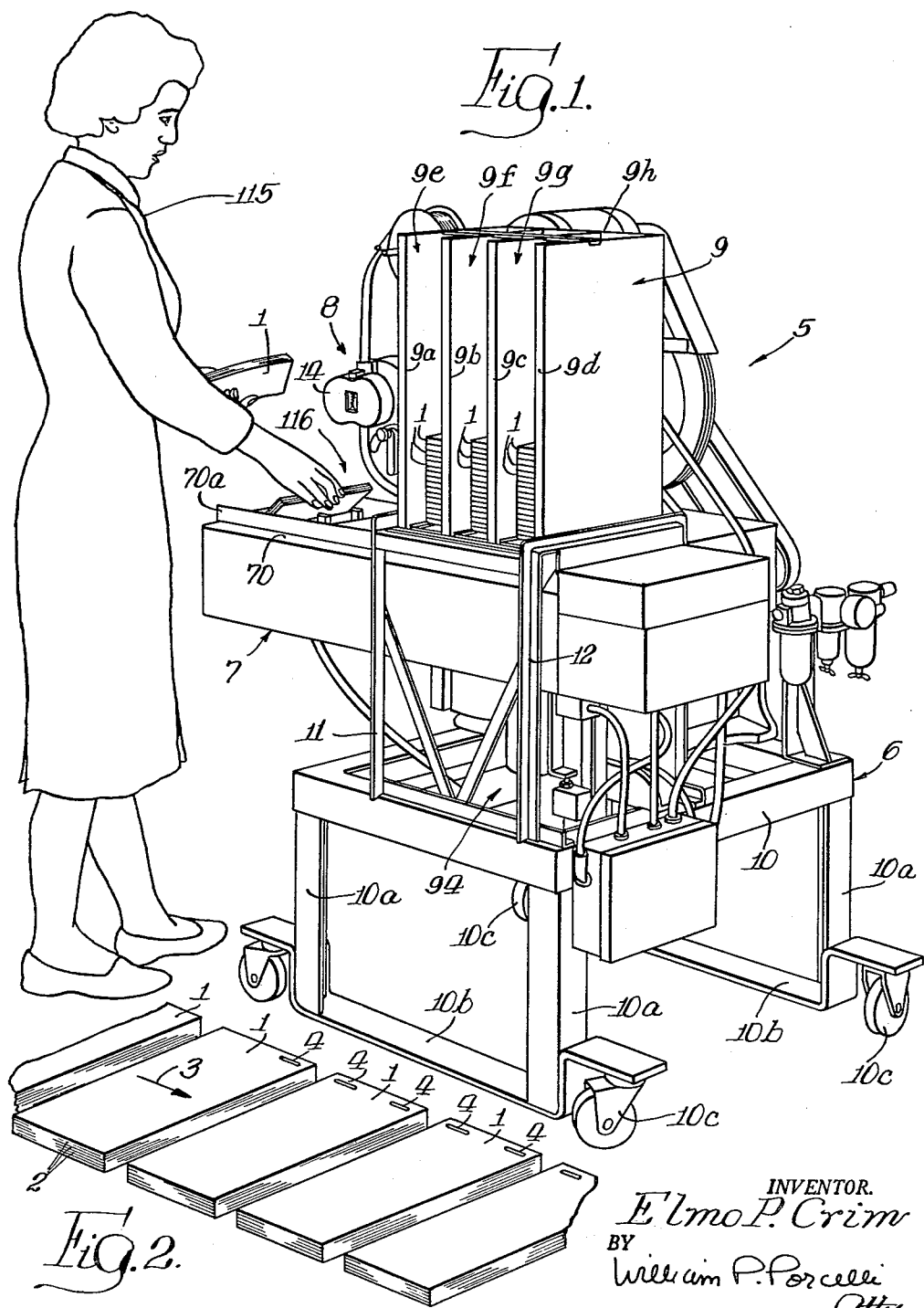

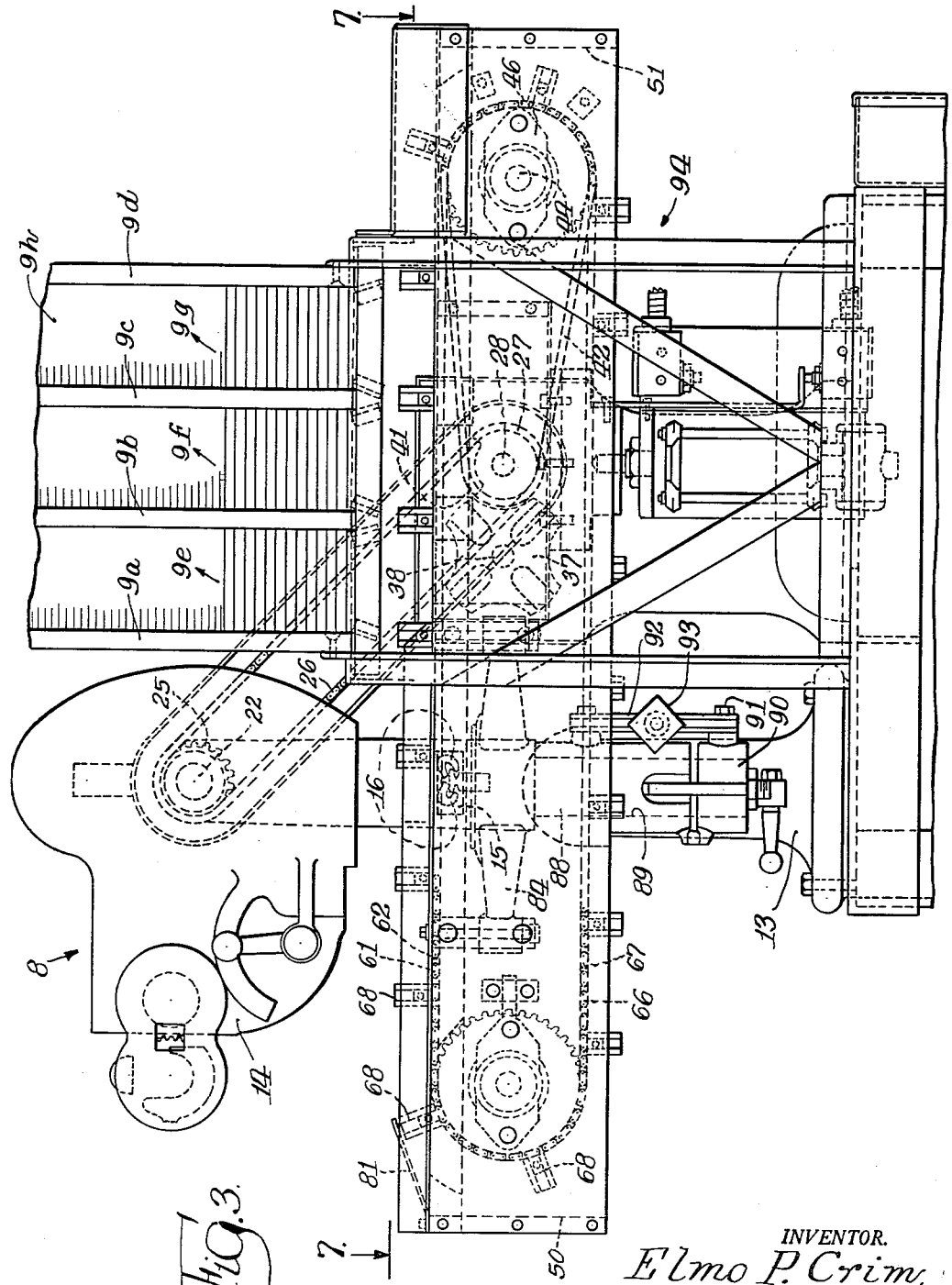

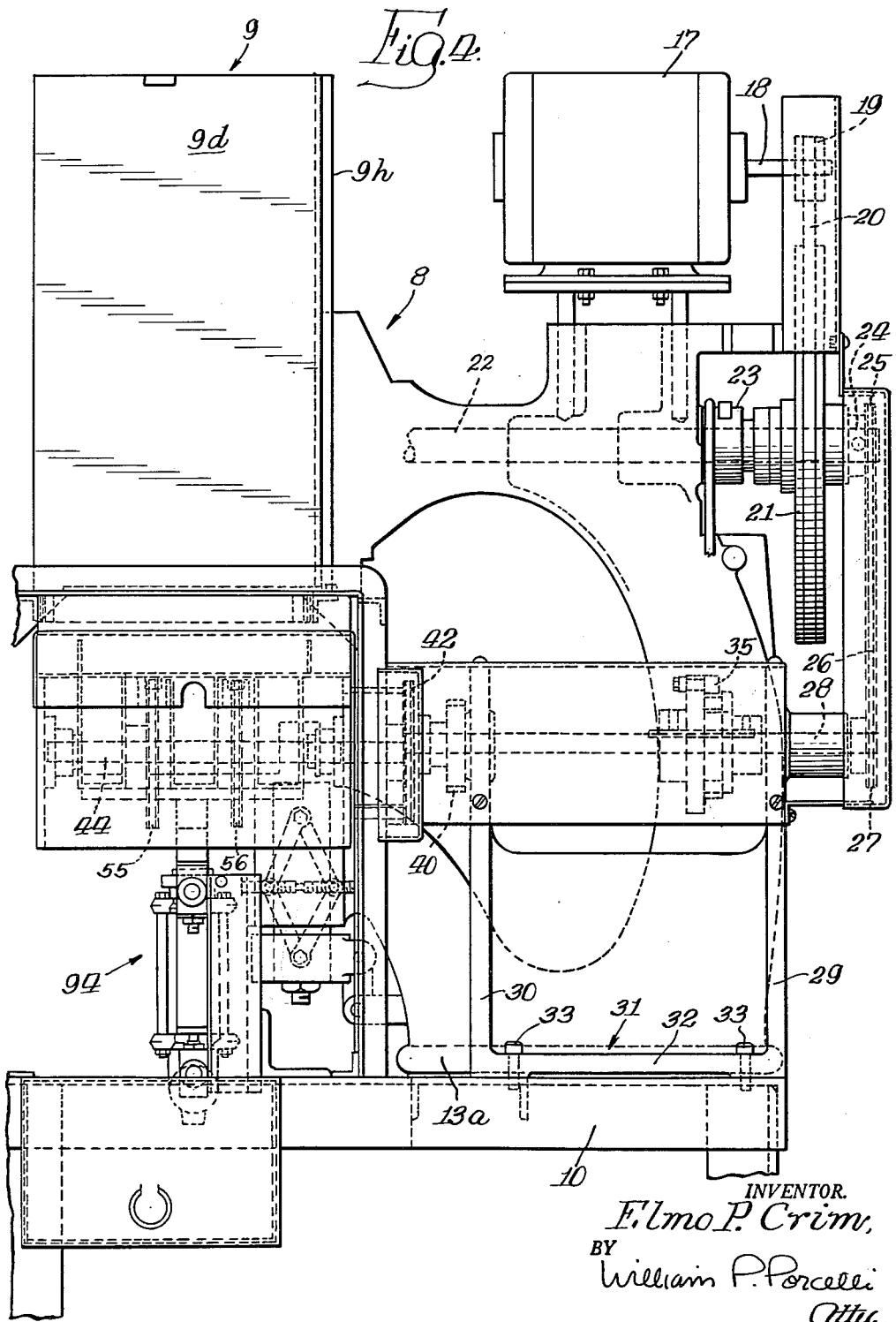

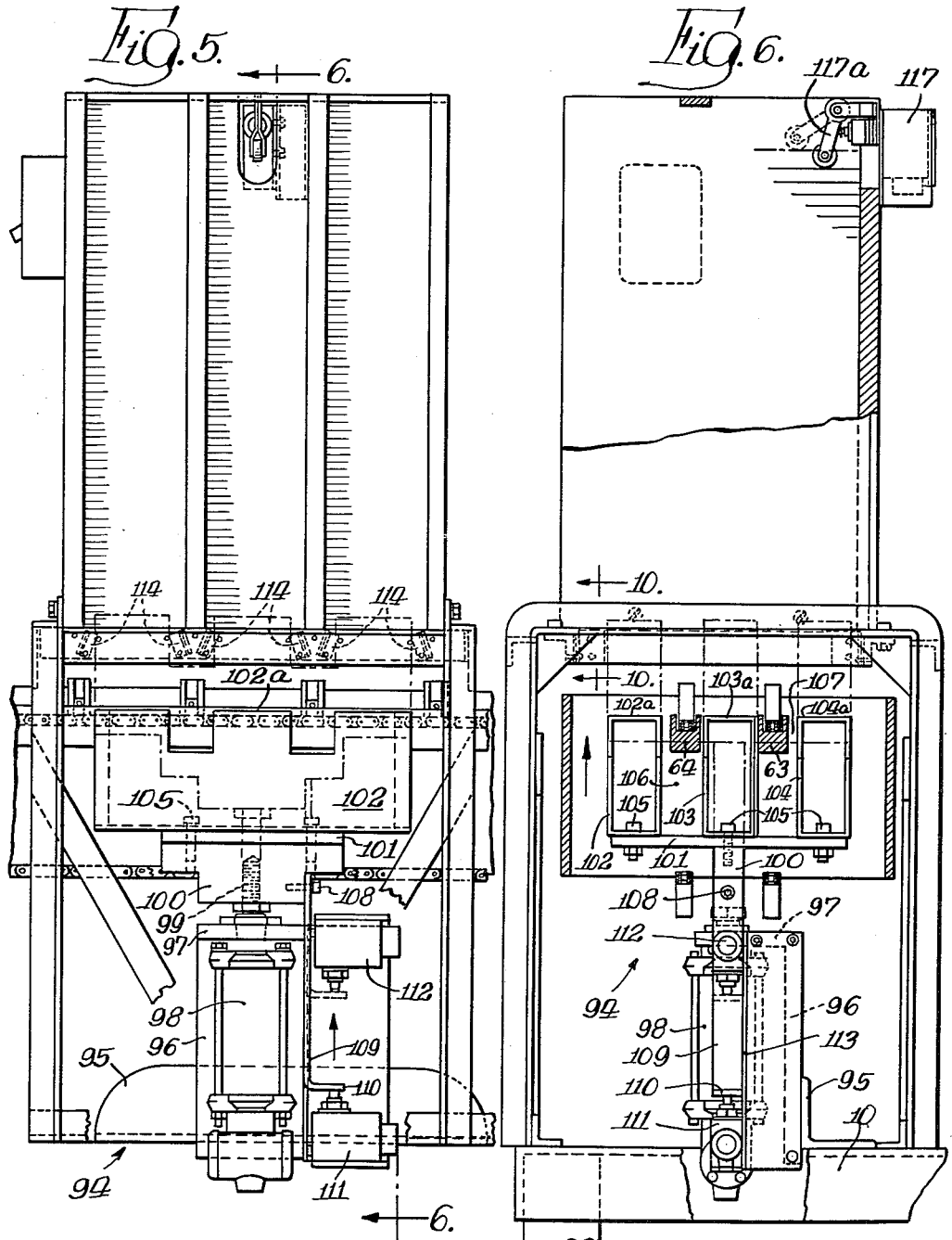

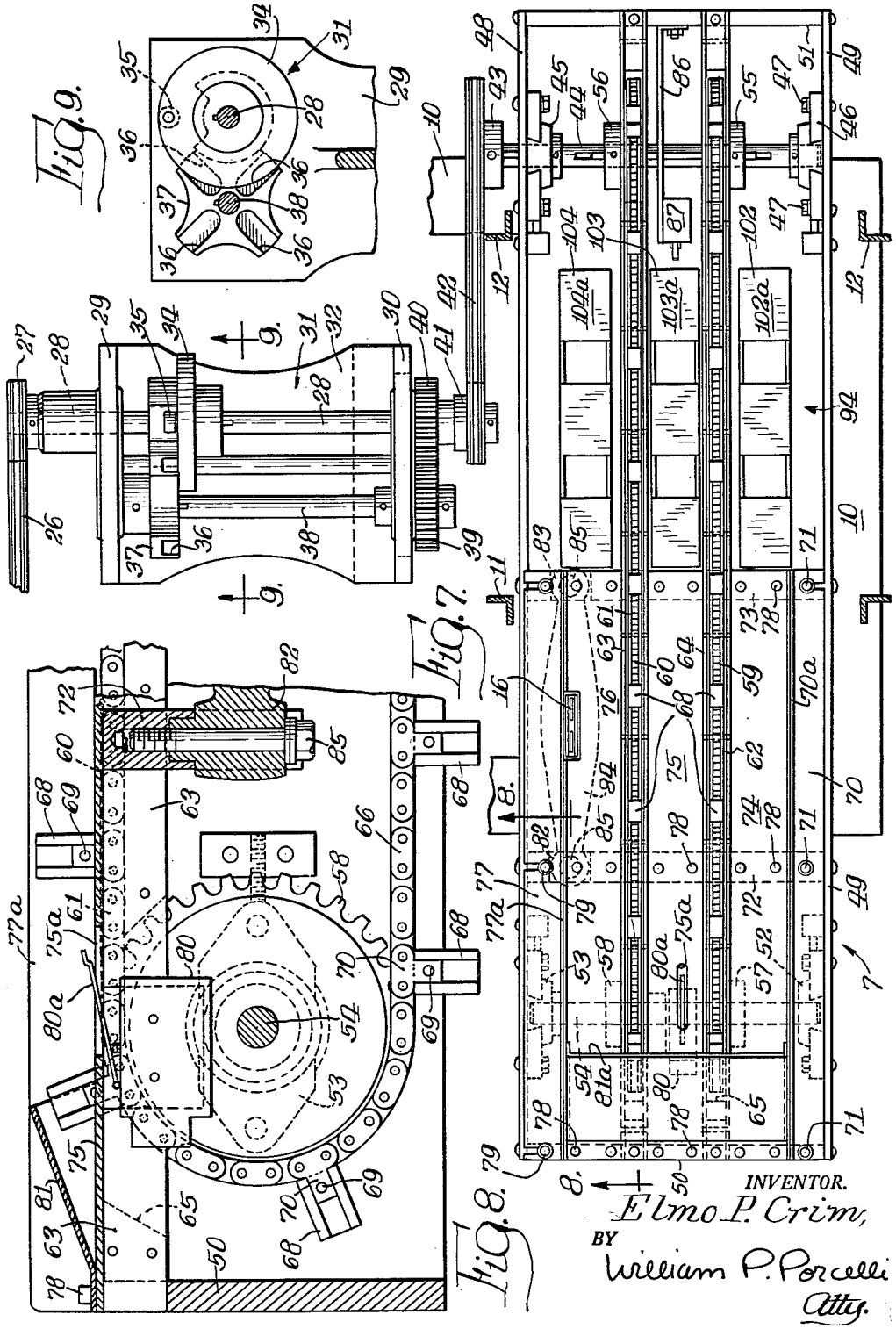

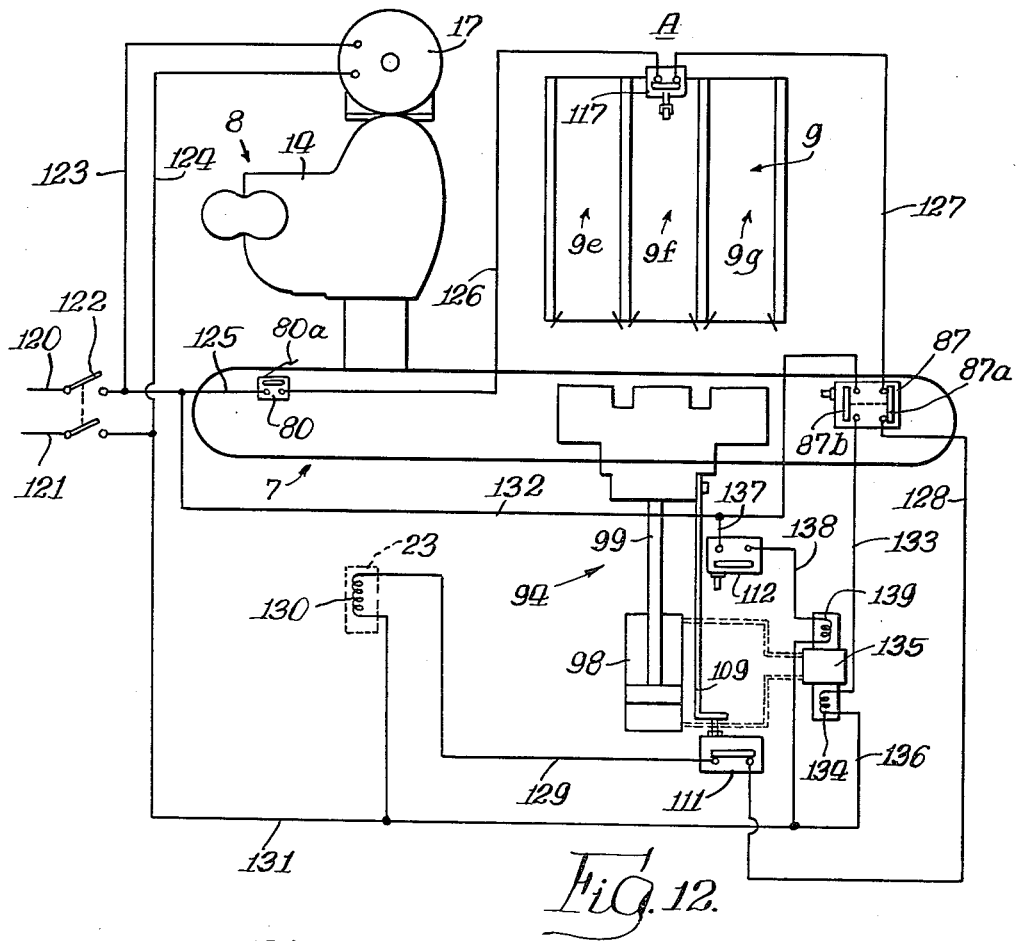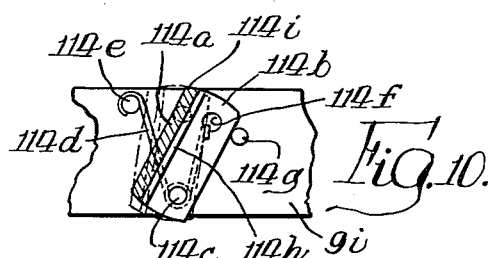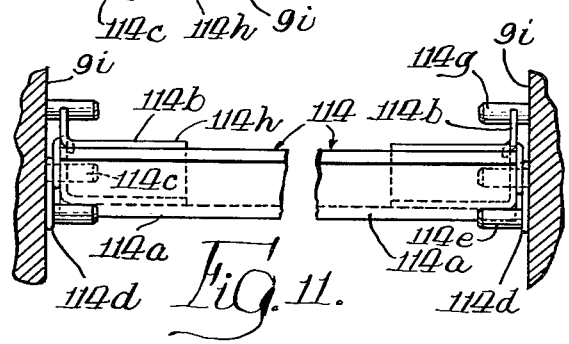

1

3,110,033
MATERIAL HANDLING DEVICE
Elmo P. Crim, Evergreen Park, Ill., assignor to Acme Steel Company, Chicago, Ill., a corporation of Illinois
Filed Mar. 1, 1961, Ser. No. 92,535
3 Claims. (Cl. 1—106)

This invention relates to the art of material handling and to improvements in a conveyor for particular use with a fastening machine for applying fasteners to pads of cards or sheets in a predetermined order.

The present trend in industry, in order to minimize labor and increase production, is to mechanize operations whenever possible. This invention has for a principal object the mechanizing of the handling of pads of cards or sheets for automatic presentation to a fastening machine and the application of fasteners to the pads in timed relation to the movement of the conveyor and, thereafter, to transport the fastened pads to a forward station where they are automatically transported into storage bins in timed relation to the movement of the conveyor in orderly stacks in readiness for removal therefrom.

In order to achieve this, a drive is applied from the fastening machine drive to the conveyor drive through an intermittent motion type mechanism, such as a Geneva cam, whereby the conveyor is moved intermittently to reposition the pads placed thereon, first in fastening position and then progressively to a forward station where the pad in the forwardmost position can actuate means to cause other means to transport the forward pads into storage bins.

This invention has particular advantage with respect to the stitching of pads of tabulating cards which are provided with sequential numbering whereby the pads are presented to the machine in a particular numbered order and automatically stacked in the storage bins on the machine after stitching from where they can be removed and packaged without altering their numbered order.

Another object of the invention is to provide apparatus with latches against which the fastened pads cam when being displaced into the storage bins and which prevent the fastened pads after their displacement against falling from the storage bins. Structure for the latches is provided having particular advantage when fastening pads interleaved with carbon paper. The latches are especially designed for camming contact with the pads only at the ends of the pads so that resulting carbon imprints, if any, on the cards of sheets between the carbon paper sheets occur only at the ends of the pads and do not deface the main body portions of the sheets of the pads.

The latches are also designed to require a minimum of effort to cam them clear of the pads being dsiplaced into the storage bins and with no appreciable increase in force required even though the stacks of pads build up in number and weight above and against the latches.

It is another object of the invention to provide control means for the operation of the entire machine including a safety feature whereby the conveyor means and fastening means are kept inoperative so long as the means used for transporting the stitched pads to the storage bins is operating.

It is still another object of the invention to provide a conveyor means which can be used in combination with a conventional stitching machine.

It is still another object of the invention to provide apparatus of the type mentioned wherein means is provided for jogging the loose sheets of the pads into alignment automatically upon movement of the conveyor so that accurate stacking of the sheets ahead of time is not required. This is accomplished by providing spaced projections or lugs on the conveyor which are spaced from each other by approximately the width of each finished pad along the horizontal portions of the conveyor, but provide a larger space for the delivery of pads having unevenly stacked sheets at the loading station of the conveyor, the movement of the lugs forward with the conveyor closing up the space to cause the unevenly stacked sheets to become aligned.

Other objects and advantages of the invention should become apparent upon reference to the accompanying drawings, in which:

FIG. 1 shows a perspective view of the apparatus of this invention as it appears during use;

FIG. 2 shows a plurality of pads in alignment with each other in positions corresponding to their pattern of movement through the apparatus of FIG. 1;

FIG. 3 shows a front elevation of substantially all of the upper main portions of the apparatus of FIG. 1;

FIG. 4 shows a right side elevation of the apparatus of FIG. 3;

FIG. 5 shows a partially cutaway portion of a portion of the mechanism shown in FIG. 3;

FIG. 6 shows a sectional view along the line 6—6 of FIG. 5;

FIG. 7 shows a sectional view along the line 7—7 of FIG. 3 and shows the major portions of the conveyor and its driving means;

FIG. 8 shows a sectional view along the line 8—8 of FIG. 7;

FIG. 9 shows a view along the line 9—9 of FIG. 7;

FIG. 10 shows a sectional view along the line 10—10 of FIG. 6 and indicates only those portions relating to the latch mechanism at the entry to a storage bin;

FIG. 11 shows a top view of the portion of the latch mechanism shown in FIG. 10; and FIG. 12 is a simplified wiring diagram of the electrical power and control circuits for the operation of the entire apparatus and shows portions of the apparatus diagrammatically.

As shown in FIG. 2, a typical pad 1 to be handled and stitched by the apparatus of this invention consists of a plurality of sheets or cards 2 of the same rectangular shape superimposed upon each other in a stack. These pads 1 pass through the apparatus in positions as shown in FIG. 2 in a row one after the other in the direction of the arrow 3. As they progress through the machine, they are provided with spaced fasteners or stitches 4 which is the term commonly used for U-shaped clinched staples. Although two spaced fasteners or stitches 4 are shown for each pad 1, the apparatus could be designed to apply any number necessary.

The particular form of apparatus 5 shown can be divided into a few major units. There is the base 6 which supports the apparatus, the conveyor portion 7 which transports the pads past the fastener or stitcher means to the storage means, there is the fastener or stitcher means 8, the elevator means 94, and the storage means 9. The base 6 is provided with a rectangular frame 10 having four downwardly extending leg supports 10a at its four corners and the bottom ends of these leg supports 10a are mounted on two caster support members 10b which carry casters 10c at their ends and these casters 10c support the weight of the entire apparatus 5.

Supported on the upper surface of the rectangular frame 10 are two inverted U-shaped angle members 11 and 12 which have supported thereon at their upper regions the storage means 9. This storage means 9 consists of four spaced side walls 9a, 9b, 9c and 9d which are spaced apart from each other by a distance equal to the width of each of the pads 1 so that three compartments 9e, 9f and 9g are provided. The four walls are all connected to a back wall 9h.

Ahead of the storage means 9 is the stitcher means 8 and this consists of a stitcher frame 13 supported at its base 13a on the rectangular support frame 10 and suitably secured thereto by welding, or the like. At the forward end of the upper portion of the stitcher frame 13 is the stitcher head 14 which contains the working parts of the stitcher means which causes a U-shaped staple to be formed and driven into a pad 1 as a stitch 4. At the forward end 15 of the lower portion of the stitcher means 8 are activated clinchers 16 which are used to clinch the legs of the U-shaped staples after they are passed through the pads 1. Both the mechanism in the stitcher head 14 and that associated with the clinchers 16 are of a conventional type and can be manufactured in different well-known ways to accomplish the stitching job.

Moving to the rear of the stitcher frame 13 there is a motor 17 mounted above it and suitably secured to it. The shaft 18 of the motor rotates a pinion 19 which drives a belt 20 to drive a flywheel 21. The flywheel is mounted ordinarily for free rotation on the stitcher shaft 22 and, in a well-known manner, a clutch 23 actuated by a solenoid can be used to either intermittently allow engagement of the flywheel 21 with the shaft 22 or else in a continuous manner. Ordinarily, the clutch 23 is of a type which allows for single revolution or cycle of the stitcher to complete one stitch and of a type whereby it can be held actuated to cause repeat stitching or cycling.

At the very end 24 of the shaft 22 is a sprocket 25 which drives a chain 26 to drive another sprocket 27 which is secured to the outer end of an auxiliary shaft 28. As viewed in FIGS. 3, 4, 7 and 9, this shaft 28 is journalled in two walls 29 and 30 of a U-shaped casting 31 which is secured at its base 32 by means of screws 33 to the rectangular frame 10. This shaft 28 is provided with a Geneva drive wheel 34 keyed to it so that it rotates with the shaft 28 as the sprocket 27 is rotated by the chain 26. This drive wheel 34 is provided with a drive roller 35 which engages one of four radial grooves 36 in a Geneva follower wheel 37. This follower wheel 37 is keyed to another shaft 38 which is journalled in the walls 29 and 30 of the casting 31 in a position parallel to the shaft 28. Beyond the wall 30 the shaft 38 is keyed to a gear 39 which is thereby rotated at the same time as the Geneva follower wheel 37. This gear 39 has teeth which engage the teeth on another gear 40 which is journalled to freely rotate on the shaft 28. This gear 40 is, in turn, connected to a sprocket 41 having teeth engaging a chain 42 which drives another sprocket 43 keyed onto the end of a first conveyor shaft 44. Since there are four radial grooves 36 mounted at equal quadrants around the follower wheel 37, the drive roller 35, for each revolution of the drive wheel 34, causes the follower wheel 37 to be rotated through 90 degrees or one-quarter of a revolution. Then, as the drive wheel 34 continues to rotate through the remaining three-quarters of its revolution, the follower wheel 37 remains idle. By this motion, the follower wheel moves one-quarter revolution for every full revolution of the drive wheel 34 and only for one-quarter of the time that the drive wheel 34 is rotating. It should be apparent that this causes the sprocket 43 to drive the first conveyor shaft intermittently, even though the drive wheel 34 might be rotated constantly.

As viewed especially in FIGS. 3, 4 and 7, the shaft 44 is journalled in two spaced pillow blocks 45 and 46 which are secured by screws 47 to two side walls 48 and 49 of the conveyor portion 7. These two side walls 48 and 49 are connected to two end walls 50 and 51, which together with the side walls form a rectangular frame. Toward the end opposite to where the shaft 44 is mounted, there are two more pillow blocks 52 and 53 in which are journalled a second conveyor shaft 54 extending parallel to the shaft 44. The shaft 44 is provided with two centrally located and spaced apart sprockets 55 and 56 while the shaft 54 is provided with two identical sprockets 57 and 58 positioned opposite the first two mentioned sprockets. These sprockets 55 and 57 are provided with an encircling chain 59 while the sprockets 56 and 58 are provided with a second encircling chain 60. These chains 59 and 60 are guided at their upper courses 61 and 62 in channel members 63 and 64 which are each provided with cut-outs 65 at their end regions in the vicinity of the sprockets 55 to 58 in order to allow the chains to wrap down around the sprockets leading from their upper courses 61 and 62 to their lower courses 66 and 67 (FIG. 8).

Spaced at equal intervals along the entire lengths of both chains 59 and 60 are projecting lugs 68. These projecting lugs are mounted by pins 69 to special T-shaped chain lengths 70. These lugs 68 are used to both jog or force the sheets of the pads 1 into even stacks and then cause the pads to be moved along the conveyor portion 7 past the stitcher means 8 and then beneath the storage means 9.

On the forward edge of the conveyor portion 7 is a guide angle 70 which is secured by means of screws 71 to the end wall 50 and support brackets 72 and 73. This angle 70 is provided with an upwardly extending flange 70a which acts as a retaining wall for pads placed on the conveyor portion. Adjacent to the angle 70 is a plate 74 on one side of the channel 64. On the opposite side of the channel 64 and on one side of the channel 63 is another plate 75. On the opposite side of the channel 63 is another plate 76. These three plates 74, 75 and 76 provide a smooth bed across which the pads can be carried as they are passed over the conveyor portion and they are secured to the end wall 50 and the two support brackets 72 and 73 by screws 78. Adjacent to the plate 76 is a back guide angle 77 which has a vertical flange 77a which is another retaining wall for guiding the pads 1. This angle 77 is also secured to the end wall 50 and the support brackets 72 and 73 by means of screws 79.

Mounted beneath the plate 75 above the shaft 54 is a trip switch 80 having an actuating arm 80a extending upwardly through a slot 75a in the plate 75 to project above it. A cover plate 81 is provided adjacent the region of the switch 80 and extends with its forward edge 81a at approximately the start of the loading position for the conveyor portion 7.

The support brackets 72 and 73 are each secured to opposite ends 82 and 83 of a cross arm 84. As shown particularly in FIG. 8, each end 82 and 83 is secured to its respective support bracket by means of a long bolt 85. The cross arm 84, in turn, is connected to the stitcher means 8 as hereinafter described.

At the forward end of the conveyor portion 7 is a bracket 86 supporting the elevator switch 87. This elevator switch 87 has two sets of contacts, one of which is used to cause elevator means to transfer stitched pads 1 into the storage means 9. Its other set of contacts is used as a safety means to prevent conveyor movement while elevating. The action of this switch will be described subsequently in relation to the entire electrical system of the apparatus. When the pads are moved from the loading or receiving station to the stitching position in alignment with the stitcher head 14, the mechanism of the stitcher head is actuated to form, drive and clinch a stitch or staple into the pad. The mechanism in the stitcher head 14 for accomplishing this is old in the art, as previously mentioned, very well-known and can be varied greatly. As mentioned, the cross arm 84 is mounted on the stitcher means 8. It is secured to the upper end of a shaft 88 which is telescoped through a bore 89 in the forward lower end of the stitcher frame 13. This shaft 88 can be raised or lowered through this bore 88 and the bottom end of the shaft 88 is provided with a sleeve 90 which is connected by a screw 91 to a toggle mechanism 92. By proper manipulation of the toggle screw 93, the shaft 88 can be controlled to move upward or downward through the bore 89. When this occurs, the cross arm 84 is likewise raised or lowered. In the upper region of the shaft 88 beyond the cross arm 84 are mounted the activated clinchers 16 which are used to clinch the stitches or staples driven through pads 1. Therefore, when a pad 1 is mounted directly above the position of the clinchers 16, the stitches are caused to be driven by the stitcher means 8 and clinched by the clinchers 16 to complete the stitch formation in the pad. As previously mentioned, the activation of these clinchers 16 is well-known in the art and is ordinarily controlled through the stitcher frame 13 by a cam action provided from the operation of the main shaft 22 of the stitcher.

After stitching has occurred, and three sequential pads have been moved to a position below the storage means 9, the elevator means 94 is used to raise the three pads above it into the storage means 9. The elevator means 94 is shown in FIGS. 3, 4, 5, 6 and 7 and partially in FIG. 1. Mounted on the upper surface of the rectangular frame 10 is an angle member 95 and secured to its forward face is a vertical plate 96 which has secured to its upper end a forwardly projecting horizontal plate 97. This horizontal plate 97 supports an air cylinder 98 at its upper end. The piston rod 99 of the air cylinder 98 is threadably connected to a T-shaped block 100 which is secured to the lower surface of a flat rectangular plate 101. The rectangular plate 101 supports three rectangular tubes 102, 103 and 104 which project upwardly from it and are secured to it by means of screws 105. These rectangular tubes 102, 103 and 104 are spaced from each other by suitable amounts to provide spaces 106 and 107 between them so that the tubes can be positioned clear of the channel members 63 and 64 of the conveyor means 7. The upper surfaces 102a, 103a and 104a are ordinarily immediately below the upper level of the channels 63 and 64 when the channels 63 and 64 are in their lowermost position. Adjustment of the position of these channels 63 and 64 up and down is determined by the position of the cross arm 84 as previously described. It should be noted at this time that raising or lowering of the cross arm 84 also raises and lowers the entire conveyor means 7 and the purpose of raising or lowering the entire conveyor means is to bring the pads being stitched into a different position relative to the stitcher head to effect a tighter or looser clinch of the stitches.

When it is time to elevate the pads positioned on the conveyor means directly above the tubes 102, 103 and 104, air is admitted to the air cylinder 98 in a direction to cause the piston rod 99 to extend and raise the tubes 102, 103 and 104 up against the pads and thereby elevate them into the bins 9e, 9f and 9g of the storage means 9.

Secured to the block 100 by means of a screw 108 is a downwardly extending L-shaped bracket 109 which has a projecting lower end 110 used to actuate either safety switch 111 or elevator down switch 112. These two switches are secured to an L-shaped plate 113 secured to the members 96 and 97.

When the pads 1 are forced upwardly into the storage bins 9e, 9f and 9g, they are pushed past latches 114 which are mounted below the storage regions immediately at the entrance to the bins of the storage means 9. As shown particularly in FIGS. 10 and 11, each latch 114 consists of a rectangular bar 114a secured at its ends to angles 114b. These angles 114b are pivoted on pins 114c to end wall portions 9i of the storage means. A spring 114d is encircled around each of the pins 114c with one end hooked onto a pin 114e secured to the end wall portion 9i and its opposite end is hooked into a hole 114f of the angle 114b. The action of the spring 114d is such as to urge rotation of the latch 114 in a clockwise direction as viewed in FIG. 10. A pin 114g is also provided in the end wall portion 9i to limit its clockwise movement. The pin 114e is provided to limit counterclockwise movement.

In operation, a pad being pushed upwardly by one of the rectangular tubes 102, 103 or 104, is urged against the region 114h of each of the angles 114b without actually contacting the rectangular bar 114a. Since these regions 114h are positioned to contact only the end regions of the pads 1, any undue pressure on the pads by this camming action which might cause imprinting of the carbon from carbon paper interleaved between other sheets of the pad will only occur in these end regions where the pressure is applied. Therefore, these latches will prevent any undesirable carbon imprinting for this type of pad in the main body portions of the sheets contained within the pad. As the pads push against the latches 114, they cause counter-clockwise rotation of the latches, as viewed in FIG. 10, and after the pads have been pushed past the latches 114, the latches 114 drop down in a clockwise direction against the pins 114g. In that position the upper edge regions 114i act as direct supports for the pads passed into the storage bins. Although the reference of clockwise and counter-clockwise rotation of the latches has been in reference to the latch shown in FIGS. 10 and 11, this is merely by way of example since, as is evident in FIG. 5, the rotational movement of every other latch 114 is necessarily opposite to that as shown in FIGS. 10 and 11. It should also be noted that the edge regions 114i are necessarily approximately in alignment with the pivot pins 114c below them. The purpose of this is to minimize the force required to spread the latches apart when the pads are camming against them. With these edges 114i directly above the pivot pins 114c, rotational movement of the latches 114 causes a lowering of these edges 114i so that there is no component of force which must be overcome tending to raise those pads already in the storage means.

To briefly summarize the operation, initially the operator 115 positions pads 1 of loosely stacked sheets 2 sequentially into the receiving station 116 in a manner as shown in FIG. 2. Each time a pad 1 is positioned in this receiving station 116, it is positioned between two projecting lugs 68, one of which, as viewed in FIG. 8, is disposed angularly relative to the one leading it. This means that a wider spacing is provided between these two lugs 68 at the receiving station so that the pad can be positioned without difficulty. As soon as the first pad 1 is positioned, it deflects the actuating arm 80a of the trip switch 80 to start a cycle of operation. This causes the angularly positioned lug 68 to move forward and into a vertical position parallel to the lug leading it. As this occurs, this lug causes the loose sheets of the pad to be jogged or forced into a neat, straight pack after which the lugs continue to transport the pads along the conveyor means. The cycling of the apparatus is such that the conveyor will move a total distance equal to twice the spacing of the stitches of each pad in two steps before a single cycle is completed. This distance is also equal to the pad width plus the lug width. During the first step, the stitcher means 8 will cause a single stitch to be driven and clinched through the pad which is in stitching position. After a single stitch has been driven, the pad originally positioned in the receiving station 116 will not have passed entirely by the actuating lever 80a of the trip switch 80 so that it is still depressed. This causes a repeat cycling of the stitcher which causes the second stitch to be driven and clinched in the pad. Subsequent to the driving of the second stitch, the cycle stops unless another pad is presented to the receiving station 116. It has been presumed that, prior to the positioning of the first pad 1 to the receiving station 116, the conveyor ahead of the storage region had been filled so that there were pads in the stitching region below the stitcher head 14. After stitching and after the conveyor moves for a distance equal to the spacing of the stitches, as long as pads 1 are fed to the receiving station 116 after the second stitch of the cycle, the machine will continue to operate. If no pad is presented to the receiving station, the apparatus will be arrested after two stitching cycles which necessarily involves two steps in the movement of the conveyor.

As the pads 1 are moved along the conveyor and stitched, the leading pad ultimately hits the actuating arm of the elevator switch 87. This causes air to be admitted in the proper direction to the air cylinder 98 to raise the rectangular tubes 102, 103 and 104 of the elevator means 94 to cause the three pads above the tubes to be displaced into the storage bins 9e, 9f and 9g below any pads already in the storage bins. When the bins fill up to the required amount, an accumulator switch 117 is actuated when the uppermost pad in the middle bin 9f contacts the roller 117a of the switch 117. Actuation of this switch 117 arrests motion of the stitcher means 8 and the conveyor portion 7.

One of the advantages of the movement of the pads 1 through the apparatus is that their numbering sequence, if numbered, is not destroyed. If the pads are fed to the apparatus in numerical order, they can be removed from the apparatus and kept in numerical order. This is accomplished because the three stacks that fill the three bins 9e, 9f and 9g have equal numbers of pads in them at all times and are numbered from right to left in each row (FIG. 3) and sequentially down through the rows. When removing the pads from the bins, they are preferably stacked in rows of three stacks positioned as in the bins. Then, when the pads are subsequently removed in use or for further processing, actual numerical order can be maintained by removing the pads one at a time from right to left starting at the top of the stacks.

The entire electrical circuit for the apparatus is shown in FIG. 12. A supply voltage is connected between the two conductors 120 and 121. These conductors lead through a master switch 122 which are connected to two conductors 123 and 124 connected to the electric motor 17 which powers the stitcher means 8 and the conveyor portion 7. Conductor 120 also connects to the trip switch 80 through a conductor 125. A conductor 126 connects trip switch 80 with the accumulator switch 117. The accumulator switch 117 is connected by a conductor 127 to one set of contacts 87a of the elevator switch 87. The opposite side of these contacts 87a is connected by a conductor 128 to the safety switch 111. The safety switch 111 is, in turn, connected by a conductor 129 through the solenoid 130 to conductor 131 which completes the circuit at a junction to 121 through the master switch 122. The solenoid 130 is that which is energized or de-energized for the purpose of actuating the clutch 23 used to cycle the stitcher means 8.

The elevator switch 87 also has a second set of contacts 87b which are connected from the master switch 122 by a conductor 132 to a conductor 133 leading to a solenoid 134 of a solenoid valve 135 used to control flow of air into the elevator air cylinder 98. A conductor 136 completes the circuit through the solenoid 134 to the conductor 131 and to the master switch 122. Another conductor 137 leads from conductor 132 through the elevator down switch 112, through conductor 138, through solenoid 139, to the conductor 131 and master switch 122. The solenoid 139 is part of the solenoid valve 135 for controlling the air supplied to the elevator air cylinder 98.

In operation, closing of the master switch 122 causes the motor 17 to be energized and to start rotation of the flywheel 21 on the stitcher shaft 22. At this time, the flywheel 21 rotates freely while the shaft 22 remains stationary and all other mechanism of the apparatus remains stationary. Initially, pads 1 are positioned ahead of the receiving station 116 so that a pad is positioned below the stitcher head 14 ready for the placement of a stitch or staple when the machine starts. Then, an unstitched pad 1 is placed in the receiving station 116 (FIGS. 1 and 8) on the conveyor means 7. In the initial position, two lugs 68 project upwardly as shown in FIG. 8 with the trailing lug 68 at a slight angle to the chain wrapped around sprockets 57 and 58. As the pad is dropped, the arm 80a of the trip switch 80 is depressed to cause the contacts of the switch 80 to close. Assuming that the accumulator switch contacts 117 are now closed because the storage bins 9e, 9f and 9g are not filled, this causes voltage to be applied through the closed switch contacts 87a of the switch 87 through the closed switch contacts of the switch 111 and through the solenoid 130 to the conductor 131. This energizes the solenoid 130 to actuate the clutch mechanism 23 of the stitcher means 8. Actuation of the clutch 23 initiates the stitching cycle to cause the stitcher head 14 to drive and clinch by means of the clinchers 16 a staple into a pad positioned immediately below the stitcher head 14. After this one step has been completed, and while the stitcher driving and forming means are returning upwardly, rotation of the auxiliary shaft 28 is far enough that the drive roller 35 of the Geneva drive wheel 34 engages a radial groove 36 in the Geneva follower wheel 37. This causes one-quarter revolution of the shaft 38 to cause movement of the conveyor chains 59 and 60 by a distance equal to the spacing of the stitches. This movement moves the pads on the conveyor far enough forward so that a portion of the pad just stitched is ready for a second stitch immediately behind the first stitch. With the pads advanced this amount, the pad just previously positioned at the receiving station 116 is still positioned to maintain the trip switch 80 closed since it is still in contact with the switch lever 80a. The dimensions and movements of the apparatus are deliberately designed for this to occur. Since the switch 80 is still closed, the stitcher solenoid 130 remains energized so that the stitcher means 8 will complete another stitching cycle. After the stitcher completes another stitch through the pad, and while the stitcher forming and driving mechanism is returning upwardly, the Geneva mechanism causes another short movement of the conveyor chains 59 and 60 to carry the pads another distance forward equal to the spacing of the stitches. A conventional non-repeat type clutch arrangement is used for the clutch 23 so that, upon the contacts of switch 80 opening after the pad has passed the actuating arm 88, the stitcher stops after the completion of a stitch and the forming and driving means of the stitcher have been returned to their initial starting positions, unless another pad 1 is placed into the receiving station 116 to immediately cause the switch 80 to again be closed. Thus, because a pad 1 remains on the actuating arm 80a of the switch 80 for two of the intermittent movements of the conveyor chains 59 and 60, the total operating cycle of the apparatus for each pad stitched consists of two stitching cycles. Obviously, however, by keeping the receiving station 116 constantly supplied with a fresh pad, for all practical purposes, the apparatus runs continuously.

When three pads have been stitched and advanced to a forward position with pads under each of the bins 9e, 9f and 9g, the leading pad strikes the actuating arm on the elevator switch 87 to close its contacts 87b and thereby energize solenoid 134 of the solenoid valve 135. This directs air in the proper direction from a suitable air supply to the elevator air cylinder 98 to cause its piston rod 99 to elevate the rectangular tubes 102, 103 and 104 to cause the three leading stitched pads to be forced up into the storage bins 9e, 9f and 9g. It should be noted that when the switch contacts 87b are closed for this purpose the switch contacts 87a are opened. Opening of switch contacts 87a prevents energization of the stitcher solenoid 130 so that actuation of the stitcher means 8 and the conveyor means 7 are prevented during this time of movement of the elevator means 94. Also, safety switch 111 opens as the piston rod 99 extends to provide an extra precaution to prevent actuation of the stitcher means and the conveyor means. When the elevator means has reached the top of its stroke, the arm 109 strikes the actuating plunger of the switch 112 to thereby cause its contacts to be closed and this causes the solenoid 139 of the solenoid valve 135 to be energized to reverse the direction of air pressure to the elevator air cylinder 93. This causes reverse movement of the piston rod 99 and causes it to be lowered to its original position. After the elevator means 94 has been actuated in this manner, positioning of a pad 1 in the receiving station 116 again causes a repeat cycle of the stitcher means 8 and the conveyor means 7. The apparatus will continue to operate in this manner until the master switch 122 is again opened.

When the middle bin 9f is filled with pads 1, the actuating arm 117a of the accumulator switch 117 is actuated to open the contacts of this switch. Since the switch 117 is in series with the trip switch 80, its opening prevents cycling of the machine even though a pad 1 is positioned in the receiving station 116. As soon as the stacks of pads are removed from the storage bins 9e, 9f and 9g, the machine will again start its cycling.

Although only a single embodiment of the invention has been shown and described, it should be clearly understood that the invention can be made in many different ways without departing from the true scope of the appended claims:

I claim:

1. Apparatus for conveying and joining together stacked sheets in pads comprising, a conveyor for receiving pads and moving them from a receiving station to a region below a storage bin, fastening means between the receiving station and said region for joining together the sheets in each pad during their movement to said region, drive means for driving the fastening means and the conveyor, said drive means having a direct drive to the fastening means and an intermittent drive to the conveyor to provide intermittent operation of the conveyor for only a portion of each operating cycle of the fastening means, and elevator means below said region to elevate fastened pads from said region to said storage bin, said conveyor having circular end means around which it passes to provide a closed loop and having lugs projecting vertically along the upper course of the conveyor and radially of the end means, said receiving station being located in the region of the conveyor where its upper course passes from its wrap around an end means and between two of said lugs where the leading of the two lugs extends vertically from the conveyor along its upper course and the trailing of the two lugs extends radially from said end means at an angle to said leading vertical extending lug, said angular positioning providing a wide and funnel-shaped opening at the receiving station for facilitating the reception of pads narrower than said opening, said wider opening changing to a narrower opening as the trailing lug naturally assumes a vertical position along said upper course of the conveyor means as the conveyor means is operated to thereby cause unevenly aligned sheets of a pad fed to the receiving station to become vertically aligned.

2. Apparatus for conveying and joining together stacked sheets in pads comprising, a conveyor for receiving pads and moving them from a receiving station to a region below a storage bin, fastening means between the receiving station and said region for joining together the sheets in each pad during their movement to said region, drive means for driving the fastening means and the conveyor, said drive means having a direct drive to the fastening means and an intermittent drive to the conveyor to provide intermittent operation of the conveyor for only a portion of each operating cycle of the fastening means, and elevator means below said region to elevate fastened pads from said region to said storage bin, said storage bin having at least one latch at its entrance, said latch being positioned to be cammed open by a pad being elevated into the storage bin and biased to close after the pad is elevated into the storage bin past the latch, the closed latch maintaining the pad within the storage bin, said conveyor having circular end means around which it passes to provide a closed loop and having lugs projecting vertically along the upper course of the conveyor and radially of the end means, said receiving station being located in the region of the conveyor where its upper course passes from its wrap around an end means and between two of said lugs where the leading of the two lugs extends vertically from the conveyor along its upper course and the trailing of the two lugs extends radially from said end means at an angle to said leading vertical extending lug, said angular positioning providing a wide and funnel-shaped opening at the receiving station for facilitating the reception of pads narrower than said opening, said wider opening changing to a narrower opening as the trailing lug naturally assumes a vertical position along said upper course of the conveyor means as the conveyor means is operated to thereby cause unevenly aligned sheets of a pad fed to the receiving station to become vertically aligned.

3. Apparatus for conveying and joining together stacked sheets in pads comprising, conveyor means for receiving the pads and moving them from a receiving station to a storage means, fastening means between the receiving station and the storage means for joining together the sheets in each pad, and drive means for driving the fastening means and the conveyor means, said drive means having a direct drive to the fastening means and an intermittent drive to the conveyor means to provide intermittent operation of the conveyor means for only a portion of the operating cycle of the fastening means, said drive means being ordinarily initiated in motion of control means at the receiving station actuated by the presence of a pad, said control means being biased to arrest motion of the drive means when no pad is present at the receiving station.

References Cited in the file of this patent

UNITED STATES PATENTS

| | | |
|---|---|---|
| 807,541 | Cunningham | Dec. 19, 1905 |
| 1,011,787 | Hines | Dec. 12, 1911 |
| 1,841,017 | Eickhoff | Jan. 12, 1932 |
| 2,569,355 | Tubbs | Sept. 25, 1951 |
| 2,712,648 | Miller | July 12, 1955 |
| 2,792,950 | Fenton | May 21, 1957 |
| 2,857,040 | Campbell | Oct. 21, 1958 |
| 2,857,058 | Campbell | Oct. 21, 1958 |
| 2,911,646 | Vossen | Nov. 10, 1959 |
| 2,947,125 | Wilson | Aug. 2, 1960 |
| 2,953,240 | Nigrelli | Sept. 20, 1960 |